United States Patent
Macrae et al.

(10) Patent No.: US 9,521,462 B2
(45) Date of Patent: *Dec. 13, 2016

(54) PREMIUM CHANNEL PROMOTION SYSTEM AND METHOD

(71) Applicant: Rovi Guides, Inc., Santa Clara, CA (US)

(72) Inventors: Douglas B. Macrae, Weston, MA (US); Thomas E. Ward, Weston, MA (US); Kenneth S. Hancock, Nashua, NH (US); Jonathan B. Orlick, Livermore, CA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,283

(22) Filed: Feb. 8, 2016

(65) Prior Publication Data

US 2016/0156979 A1   Jun. 2, 2016

Related U.S. Application Data

(63) Continuation of application No. 14/634,612, filed on Feb. 27, 2015, now Pat. No. 9,271,049, which is a
(Continued)

(51) Int. Cl.
*H04N 5/445* (2011.01)
*H04N 21/4784* (2011.01)
(Continued)

(52) U.S. Cl.
CPC ...... *H04N 21/4784* (2013.01); *H04N 5/44543* (2013.01); *H04N 5/782* (2013.01); *H04N 7/162* (2013.01); *H04N 21/2541* (2013.01);

*H04N 21/2543* (2013.01); *H04N 21/4316* (2013.01); *H04N 21/4334* (2013.01); *H04N 21/4345* (2013.01); *H04N 21/4383* (2013.01); *H04N 21/4438* (2013.01); *H04N 21/44204* (2013.01); *H04N 21/44209* (2013.01); *H04N 21/44222* (2013.01); *H04N 21/4627* (2013.01);
(Continued)

(58) Field of Classification Search
None
See application file for complete search history.

(56) References Cited

U.S. PATENT DOCUMENTS

| 5,473,609 | A | * | 12/1995 | Chaney | ............. | H04N 5/44543 |
|---|---|---|---|---|---|---|
| | | | | | | 348/460 |
| 5,604,528 | A | * | 2/1997 | Edwards | ................ | H04N 7/167 |
| | | | | | | 340/5.28 |
| 5,841,433 | A | * | 11/1998 | Chaney | ............. | H04N 5/44543 |
| | | | | | | 348/563 |

OTHER PUBLICATIONS

Macrae et al., U.S. Appl. No. 14/634,612, filed Feb. 27, 2015.
(Continued)

*Primary Examiner* — John Schnurr
*Assistant Examiner* — Cynthia Fogg
(74) *Attorney, Agent, or Firm* — Ropes & Gray LLP

(57) ABSTRACT

The present invention is directed to a television schedule guide which includes a detector for determining whether a previously scrambled program is unscrambled. If a previously scrambled program is momentarily unscrambled or scrambled due to promotional efforts by the program provider, the system will visually distinguish the program on the guide, and a viewer may tune to or record the program from the guide. The view may also subscribe to the program provider through the guide during the promotional period.

18 Claims, 14 Drawing Sheets

Related U.S. Application Data continuation of application No. 12/749,896, filed on Mar. 30, 2010, now Pat. No. 8,997,148, which is a continuation of application No. 10/823,993, filed on Apr. 13, 2004, now Pat. No. 7,921,441, which is a continuation of application No. 09/293,201, filed on Apr. 16, 1999, now Pat. No. 6,745,391, which is a continuation-in-part of application No. 08/987,795, filed on Dec. 10, 1997, now abandoned.

(60) Provisional application No. 60/082,046, filed on Apr. 16, 1998, provisional application No. 60/032,651, filed on Dec. 12, 1996.

(51) Int. Cl.

| | |
|---|---|
| *H04N 5/782* | (2006.01) |
| *H04N 7/16* | (2011.01) |
| *H04N 21/433* | (2011.01) |
| *H04N 21/434* | (2011.01) |
| *H04N 21/438* | (2011.01) |
| *H04N 21/442* | (2011.01) |
| *H04N 21/443* | (2011.01) |
| *H04N 21/4627* | (2011.01) |
| *H04N 21/482* | (2011.01) |
| *H04N 21/488* | (2011.01) |
| *H04N 21/431* | (2011.01) |
| *H04N 21/254* | (2011.01) |
| *H04N 21/2543* | (2011.01) |
| *H04N 21/81* | (2011.01) |
| *H04N 21/84* | (2011.01) |

(52) U.S. Cl.
CPC ....... *H04N 21/482* (2013.01); *H04N 21/4882* (2013.01); *H04N 21/812* (2013.01); *H04N 21/84* (2013.01)

(56) References Cited

OTHER PUBLICATIONS

Macrae et al., U.S. Appl. No. 12/749,896, filed Mar. 30, 2010.
Macrae et al., U.S. Appl. No. 10/823,993, filed Apr. 13, 2004.
Macrae et al., U.S. Appl. No. 09/293,201, filed Apr. 16, 1999.
Orlick, J.B., U.S. Appl. No. 08/987,795, filed Oct. 12, 1997.

* cited by examiner

FIG. 1F

SHOW LIST

| | 7 | 6 | 5 | 4 | 3 | 2 | 1 | 0 |
|---|---|---|---|---|---|---|---|---|
| 0x00 | | | | TYPE=0x02 | | | | |
| 0x01 | | | | NBR BLOCKS | | | | |
| 0x02 | | | | ///// | | | VERSION | |
| 0x03 | MSB | | | | | | | |
| | | | | START TIME GMT | | | | |
| | | | | | | | | LSB |
| 0x07 | | | START DELIMITER=0xEE | | | | | |
| 0x08 | RESV | PPV | GRPF | DIDF | DMYF | | | |
| 0x09 | | | | DURATION | | | | |
| 0x0A | MSB | | | | | | | |
| | | | | SHOW TITLE HANDLE | | | | LSB |
| 0x0C | MSB | | SHOW DESCRIPTION HANDLE | | | | | LSB |
| 0x0E | MSB | | | GROUP ID | | | | LSB |
| ... | | | | | | | | |
| | | | | END DELIMITER=0xFF | | | | |

Values shown on right: 0x00, 0x01, 0x02, 0x04, 0x06

FIG. 1E

CHANNEL DATA TABLE

| | 7 | 6 | 5 | 4 | 3 | 2 | 1 | 0 |
|---|---|---|---|---|---|---|---|---|
| 0x00 | | | | TYPE=0x01 | | | | |
| 0x01 | | | | NBR BLOCKS | | | | |
| 0x02 | | | | 0x00 | | | | |
| 0x03 | | | | NBR CHANNELS | | | | |
| 0x04 | MSB | | | CHANNEL ID | | | | LSB |
| 0x06 | DPF | ICF | NDF | ///// | NF | TMSB | | |
| 0x07 | | | | TUNE CHANNEL NBR | | | | |
| 0x08 | | | | TRANSPONDER NBR | | | | |
| 0x09 | | | | SATELLITE NBR | | | | |
| 0x0A | SOURCE | CHANNEL TYPE | ///// | NMSB | | | | |
| 0x0B | | | | NATIVE CHANNEL NBR | | | | |
| 0x0C | | | | NAME MASK BITS | | | | |
| 0x0D | | | | FAVORITES LINK | | | | |
| 0x0E | MSB | | SHOWLIST HANDLE TABLE HANDLE | | | | | LSB |
| 0x10 | MSB | | | | | | | |
| | | | | NAME AFFILIATION STRING | | | | |
| 0x18 | MSB | | DUPLICATE CHANNELS HANDLE | | | | | LSB |

Values on right: 0x00, 0x02, 0x03, 0x04, 0x05, 0x06, 0x07, 0x08, 0x09, 0x0A, 0x0C, 0x14

FIG.1G

SHOW TITLE ENTRY

|      | 7 | 6 | 5 | 4 | 3 | 2 | 1 | 0 |
|------|---|---|---|---|---|---|---|---|
| 0x00 | TYPE=0x50 NBR BLOCKS ||||||||
| 0x01 | CMPF | CCF | SF | BW/C | | REF CNT MSBs |||
| 0x02 | REFERENCE COUNT ||||||||
| 0x03 | MSB | | | THEME INDEX ID | | | | |
| 0x05 | | | | | | | | LSB |
|      | SHOW TITLE TEXT ||||||||

FIG.1H

SHOW DESCRIPTION ENTRY

|      | 7 | 6 | 5 | 4 | 3 | 2 | 1 | 0 |
|------|---|---|---|---|---|---|---|---|
| 0x00 | TYPE=0x60 NBR BLOCKS ||||||||
| 0x01 | CMPF | CCF | SF | BW/C | | RF | REF CNT MSBs ||
| 0x02 | REFERENCE COUNT ||||||||
| 0x03 | MSB | | | THEME INDEX ID | | | | LSB |
| 0x05 | CRITICS RATING |||| | MPAA |||
| 0x06 | TRAITS MASK BITS ||||||||
| 0x07 | YEAR PRODUCED ||||||||
| 0x08 | SHOW DESCRIPTION TEXT ||||||||

FIG.1J

THEME SUBCATEGORY TABLE

| | 7 | 6 | 5 | 4 | 3 | 2 | 1 | 0 |
|---|---|---|---|---|---|---|---|---|
| 0x00 | | | TYPE=0x06 | | | | | |
| 0x01 | | | NBR BLOCKS | | | | | |
| 0x02 | | | THEME CATEGORY ID | | | | | |
| 0x03 | | | NBR THEME SUBCATEGORIES | | | | | |
| 0x04 | | | THEME SUBCATEGORY ENTRY LENGTH(m) | | | | | |
| 0x05 | | | ATTRIBUTES FLAG | | | | | |
| 0x06 | ///// | | | | NBR THEME INDECIES(k) | | | |
| 0x07 | MSB | | | THEME ID 1 | | | | LSB |
| ... | | | | | | | | |
| 0x09 | MSB | | | THEME ID 2 | | | | LSB |
| ... | | | | | | | | |
| 6+2k | MSB | | | THEME ID k | | | | LSB |
| 8+2k | MSB | | | | | | | LSB |
| ... | | | THEME SUBCATEGORY NAME | | | | | |
| 0xm | | | | | | | | LSB |

FIG.1I

THEME CATEGORY TABLE

| | 7 | 6 | 5 | 4 | 3 | 2 | 1 | 0 |
|---|---|---|---|---|---|---|---|---|
| 0x00 | | | TYPE=0x05 | | | | | |
| 0x01 | | | NBR BLOCKS | | | | | |
| 0x02 | | | VERSION | | | | | |
| 0x03 | | | NBR THEME CATEGORIES | | | | | |
| 0x04 | | | THEME CATEGORY ID | | | | | |
| 0x05 | | | ATTRIBUTES FLAG | | | | | |
| 0x06 | MSB | | | THEME SUBCATEGORY HANDLE TABLE | | | | LSB |
| 0x07 | | | | | | | | |
| 0x08 | | | CATEGORY NAME LENGTH | | | | | |
| 0x09 | MSB | | | THEME CATEGORY NAME | | | | |
| ... | | | | | | | | |
| 0xOM | | | | | | | | |

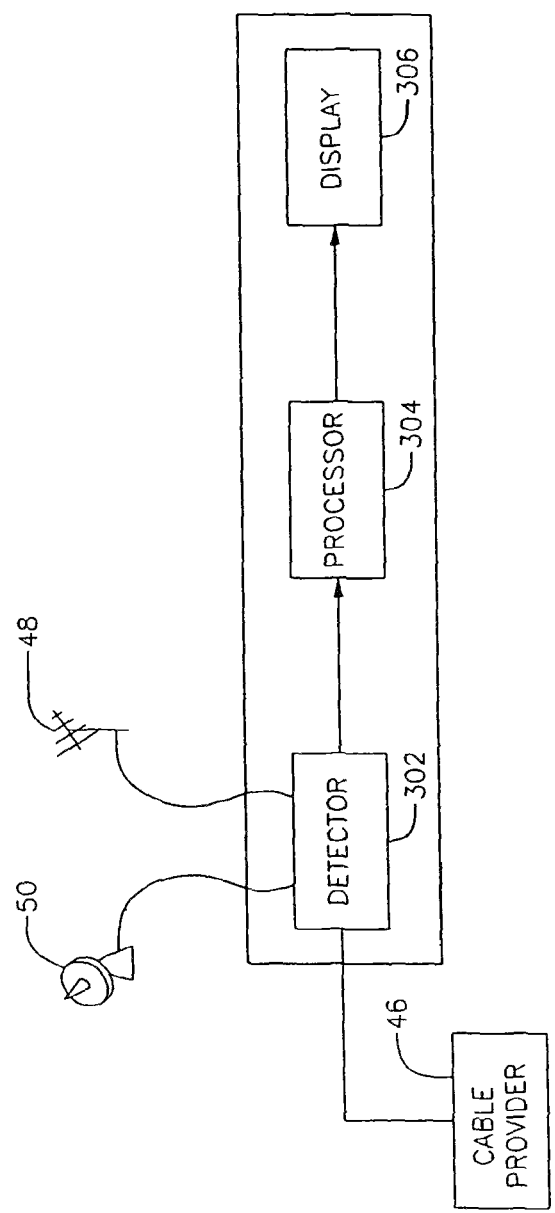

*FIG.6*

| | PIP | JUMP | RECORD | 11:45 | TV |
|---|---|---|---|---|---|
| THE TONIGHT SHOW WITH JAY LENO #NBC, CH 7 11:30PM SCHEDULED: KIRSTIE ALLEY; CLARISSA DICKSON WRIGHT, JENNIFER PATERSON ("TWO FAT LADIES") ||||||
| ◁ CATEGORY 1 | CATEGORY 2 | CATEGORY 3 | CATEGORY 4 | CATEGORY 5 ▷ |||
| WED | 11:30 PM | | 12:00 AM ||▽|
| abc | ABC NIGHTLINE | POLITICALLY IN... ||▽||
| Fox | COLUMBO |||||
| ● | A CURRENT AFFAIR | WHEEL OF FORT... ||||
| HBO | FREE TODAY |||||
| HBO 1 | SILENCE OF THE LAMBS |||||
| HBO 2 | THE LARRY SANDERS SHOW |||||
| | NOVA | THE ROCK ||▽||
| ESPN | BASEBALL: MARINERS VS. YANKEES ||▽|||
| Mtv | GRATEFUL DEAD, 11:30 PM TONIGHT! |||||
| WABU | ◁ FANTASTIC VOYAGE |||||

| IMAGE | THE TONIGHT SHOW 7 |
|---|---|
| IMAGE | COSBY TUESDAY, 8:00PM |
| | NBC FRIDAY 8:00PM |
| | F·R·I·E·N·D·S |
| | SEASON FINALE, IT'S A |
| | *SHOCKER* 🏠 |

PREMIUM CHANNEL PROMOTION SYSTEM AND METHOD

CROSS REFERENCE TO RELATED APPLICATION

This application is a continuation of U.S. application Ser. No. 14/634,612, filed Feb. 27, 2015, (currently allowed) which is a continuation of U.S. application Ser. No. 12/749,896, filed Mar. 30, 2010, (currently patented as U.S. Pat. No. 8,997,148) which is a continuation of U.S. application Ser. No. 10/823,993, filed Apr. 13, 2004 (currently patented as U.S. Pat. No. 7,921,441), which is a continuation of application Ser. No. 09/293,201, filed Apr. 16, 1999, (currently patented as U.S. Pat. No. 6,745,391), which is a continuation-in-part of U.S. application Ser. No. 08/987,795, filed Dec. 10, 1997 and claiming priority to U.S. Provisional Application No. 60/032,651, filed Dec. 12, 1996, and which claims priority of U.S. Provisional Application No. 60/082,046, filed Apr. 16, 1998, each of which is fully incorporated herein by reference.

BACKGROUND OF THE INVENTION

The present invention relates to a system for providing television schedule information, and more particularly to a television schedule information guide with capability for displaying channel promotion information.

The number of television channels available to a user has grown dramatically within the last decade, primarily due to the availability of cable and direct broadcast satellite systems. As the number of programs of potential interest to the viewer has increased, a variety of electronic program guides (EPGs) have been developed to help the viewer select programs of particular interest. For example, commonly assigned U.S. Pat. Nos. 4,706,121 and 5,353,121 each describes schedule information processing systems which provide the viewer with a convenient way to select programs based on viewer supplied selection criteria.

A viewer, however, has access to the numerous channels available through cable or satellite systems only if the viewer subscribes to those services. This is because cable and direct satellite services scramble their signals thereby allowing only a selected group of people who have pre-arranged de-scrambling capabilities to receive their signals. A viewer with a television system that does not include such de-scrambling capabilities has access to only broadcast television programs. Occasionally, however, a cable or direct satellite service provider will unscramble its signals for a particular time period to allow all viewers in a given area to have access to the signals. For example, HBO may have a free movie night for subscribers and non-subscribers of HBO in Fremont, Calif. In this manner, HBO could show potential subscribers in Fremont, Calif., a flavor of the programming it has available, and may attract some of the non-subscribers in Fremont to sign up with its service. A viewer will also benefit from such promotions, as the viewer is given a free trial of the subscription. Hence, a television schedule system that has the capability to detect that a program is unscrambled, and in turn notify the user that such program is available for selection would be desirable.

SUMMARY OF THE INVENTION

The present invention is directed to a television schedule information system, and more particularly to a system with the capability for detecting whether a program signal is scrambled or unscrambled.

In one aspect of the invention, a television schedule system configured with an EPG database includes a receiving location for receiving both regularly scrambled television channels and regularly unscrambled television channels. A processor in the system maintains the EPG database with program listings for the regularly unscrambled channels. The processor updates the EPG database when one of the regularly scrambled television channels is now unscrambled. The update might take the form of adding a program listing of the program transmitted on the now unscrambled channel for being displayed to the user. Alternatively, the update might take the form of turning on a channel and allowing it to be displayed on the guide. A viewer may then select the program title to tune to the program, schedule an autotune to the program when the program comes on, record the program, or schedule a recording of the program when the program comes on. The viewer may further subscribe to the service provider of the program during the promotional period.

In a further aspect of the invention, a promotional message informing the user of the now unscrambled program is displayed on the guide.

These and other embodiments of the present invention, along with many of its advantages and features, are described in more detail in the text below and in the attached figures.

DESCRIPTION OF THE DRAWINGS

FIG. 1E illustrates an exemplary channel data table;

FIG. 1F illustrates an exemplary show list table;

FIG. 1G illustrates exemplary show title entries;

FIG. 1H illustrates exemplary show description entries;

FIG. 1I illustrates an exemplary theme category table;

FIG. 1J illustrates an exemplary theme sub category table;

FIG. 2 is a block diagram of a detector unit for detecting whether a program signal is scrambled or unscrambled;

FIG. 6 is an illustration of an alternative grid guide including a promotional message tile.

DETAILED DESCRIPTION OF THE INVENTION

A. Overview of the System

Figure 1A:
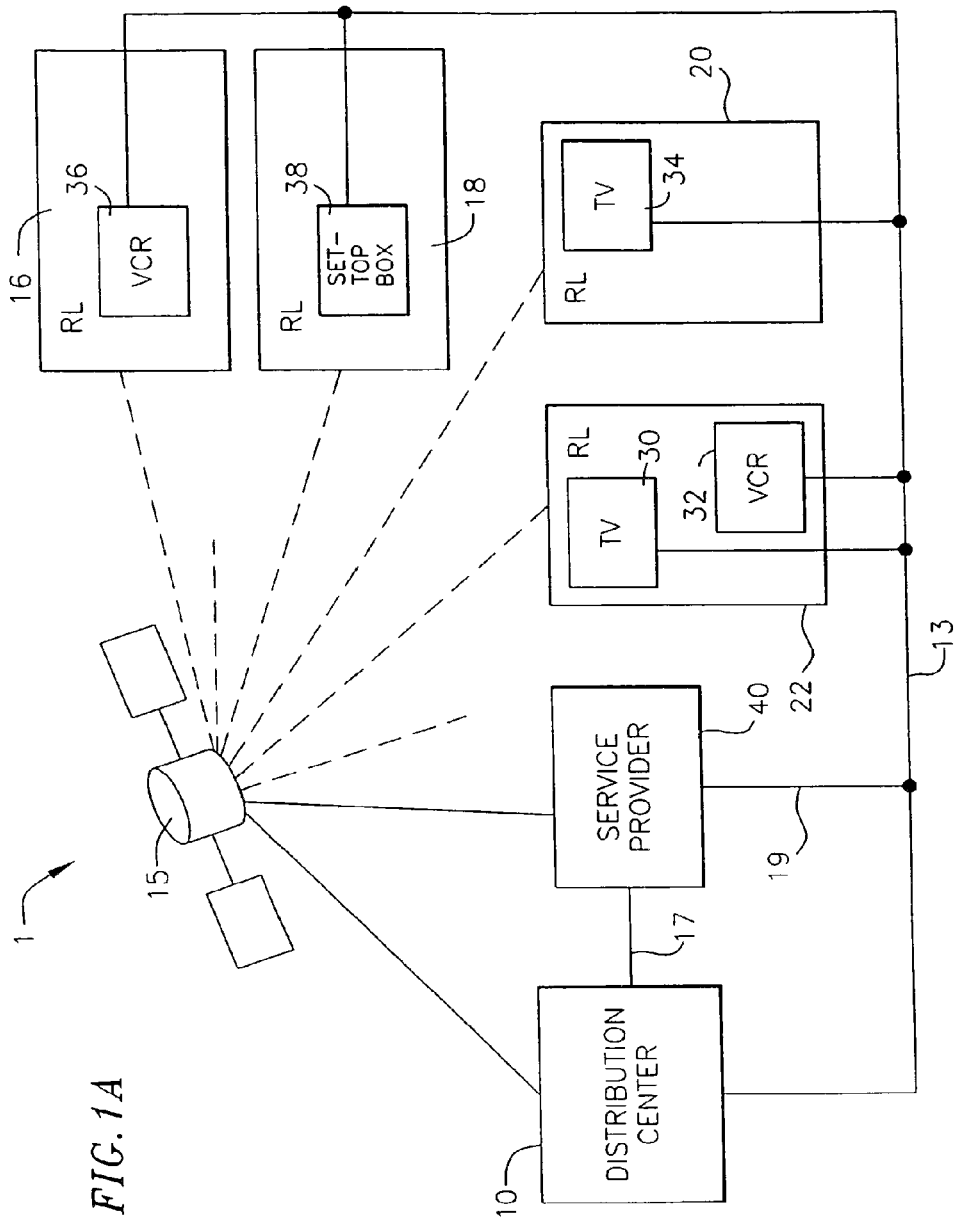
FIG. 1A illustrates a preferred embodiment of a system on which a program schedule guide according to the present invention may be displayed.

FIG. 1A illustrates a preferred embodiment of television/computer system 1 that displays a program schedule guide according to the present invention. As shown, system 1 includes a distribution center 10 and multiple receiving locations. Distribution center 10 compiles data for a data-stream. In a preferred embodiment, this data-stream is broadcast to receiving locations 16, 18, 20, and 22. Several methods are available for broadcasting the data-stream from distribution center 10 to receiving locations 16, 18, 20 and 22. For example, satellite 15 may broadcast this data-stream within the vertical blanking interval (VBI) of a television channel (e.g., PBS) or a dedicated channel to receiving locations 16, 18, 20, and 22. Alternatively, the data may also be broadcast out of band, i.e., using non channel specific mechanisms. In another preferred embodiment, the data-stream is provided to receiving locations 16, 18, 20, and 22 via transmission system 13. Transmission system 13 may be, for example, optical fiber, coax cable, telephone line, over the air television broadcast, or the like.

In yet another embodiment, peripheral devices, which are located within the receiving locations, receive the data-stream from, for example, a local service provider 40. Service provider 40 receives the data-stream from distribution center 10 via line 17, and broadcasts the data-stream to the receiving peripheral devices via satellite 15 (or another satellite), or via lines 19 and 13. The receiving peripheral devices may be televisions 30, televisions 34, VCRs 32, VCRs 36, and/or cable, satellite IRD, web-browser or set-top boxes 38.

Information in the data-stream may include television schedule information (EPG data). Software applications located within the peripheral devices utilize the schedule information provided in the data-stream to generate a schedule guide. In addition, the software applications also determine whether a program signal is scrambled. If the program signal is scrambled, the system may advise the user of such status. Preferably, the system will only advise the user if a previously scrambled program signal is unscrambled by featuring the program prominently on the guide.

Figure 1B:
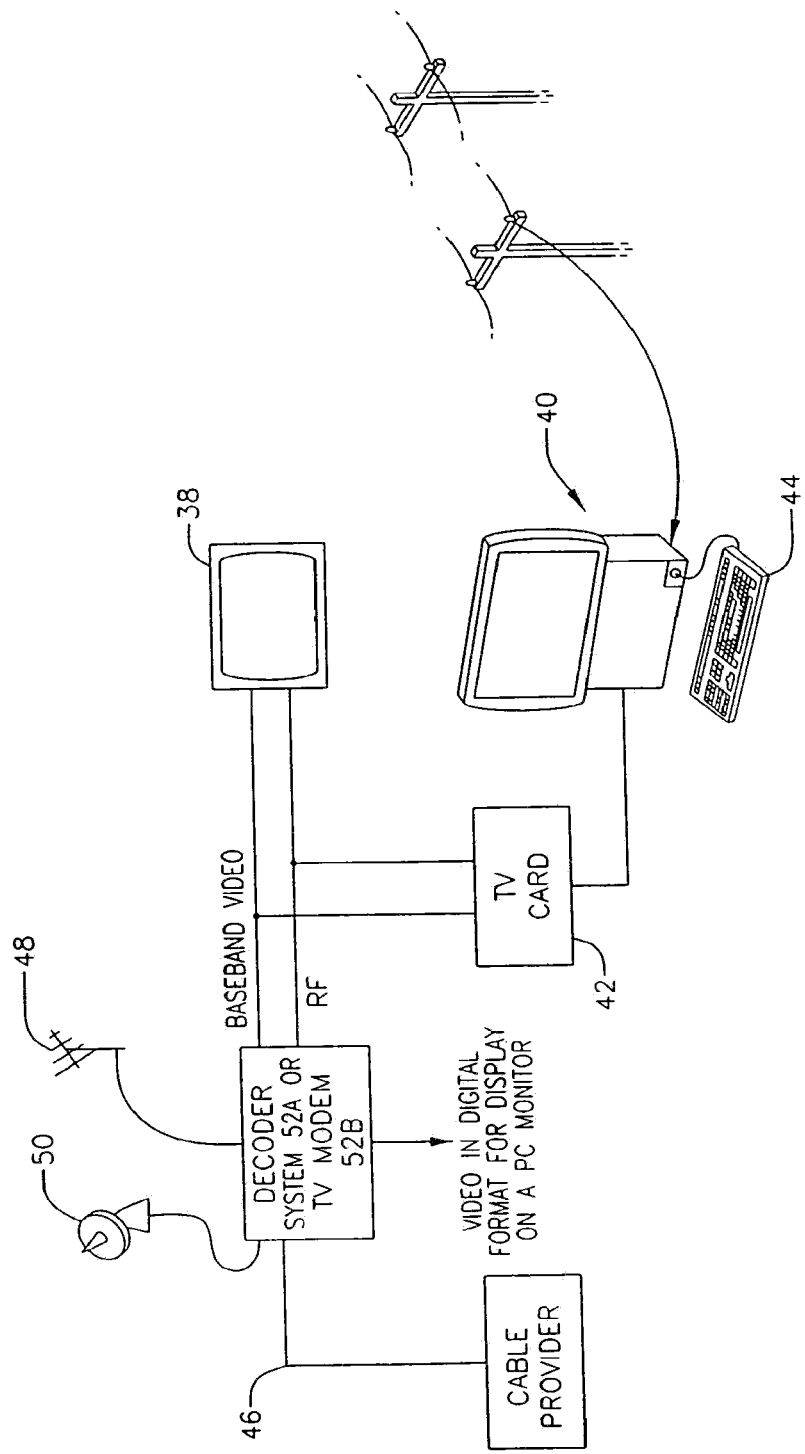
FIG. 1B illustrates another representation of the TV system.

In a preferred embodiment, the electronic program guide of the present invention may be implemented either on a personal computer, a PCTV, a television connected to a set-top box, or a television including a custom board. However, the invention is not limited to any particular hardware configuration and will have increased utility as new combinations of computers and television systems are developed. In the following, any of the above will be referred to as a "TV system". A block diagram of a representative TV system is depicted in FIG. 1B. Details of implementation are not depicted because the invention is not limited to any particular TV system.

As is well known, the picture to be displayed on a TV may be transmitted as an analog signal, for example according to the NTSC standard utilized in the United States, or as a digital signal modulated onto an analog carrier. The signals may be received over a cable 46, or via an antenna 48 or satellite dish 50. Typically, television sets are designed to receive analog signals and computer display devices are designed to display pictures encoded in a digital format. However, decoder system 52A can convert the digital data to an analog signal for display on a television set, and TV modem 52B can format analog TV signals for display on a PC monitor.

In FIG. 1B, analog or digital TV signals, received via cable, antenna, or satellite dish, are provided to either a television 38 or to a PC (not shown). If the signal is from a digital broadcast service, then a decoder converts the signal to baseband video and audio or channel 3/4 RF. If the signal is an analog signal, it is passed through as a live video output. The television, depending on its configuration, receives selected ones of the outputs and displays the received program.

If the TV is a PCTV 40, it typically includes a TV card 42, connected to either live video, baseband video, or channel 3/4 output. TV card 42 digitizes the video image and displays the video image in a resizeable window on the computer monitor. PCTV 40 may also be coupled to land telephone lines by a modem 44. If the received signal is an analog TV signal, the TV card of the PCTV digitizes the analog signal and extracts included information from the vertical blanking intervals. On the other hand, if the signal is a digital signal, separate audio, video, VBI (information such as closed caption, teletext, and program related information), program guide, and conditional access information are provided as separate bit-streams.

The video and audio bit-streams for programs are converted to a format for display and the program guide information is processed to form the program guide database. The processor, executing software stored in memory, generates interactive electronic program guide images, as well as images of received programs. The guide can be used to interact with and control programs displayed in the window.

A television system configured to display an electronic program guide such as a guide provided by StarSight telecast includes an on-screen display controller and other hardware described below. If a standard analog broadcast signal is received, program guide data is extracted from the VBI by a VBI data slicer and processed to form a program database. If a DBS digital signal is received, either from a satellite or cable, VBI and program data are provided in separate bit streams.

The program guide images are either generated locally or remotely and provided to an on screen display controller. Interactivity is provided via a remote control unit. Alternatively, the program guide can be displayed on a computer monitor that interactively controls the television set through, for example, an IR interface including an IR blaster to generate IR codes to control the television and/or a VCR.

If the electronic guide database is generated locally, the system for creating the electronic programming guide must receive television schedule information and process the received information to create a database. Thus, the system requires, a data reception unit, a processor, memory to store program code and a database, an on-screen display generator (OSD), and a control interface for tuning to selected channels.

In one embodiment, the schedule information is transmitted as a set of short commands of specified formats. Different commands communicate information such as a show schedule for a given channel, the title of each show in the schedule, descriptions and information attributes about each show in the channel. Thus, information for a show to be broadcast at a particular time is transmitted in several commands. ID numbers in the commands facilitate organizing the information into a relational database utilizing database engine (DBE) software stored in memory and executed by the processor.

Figure 1C:
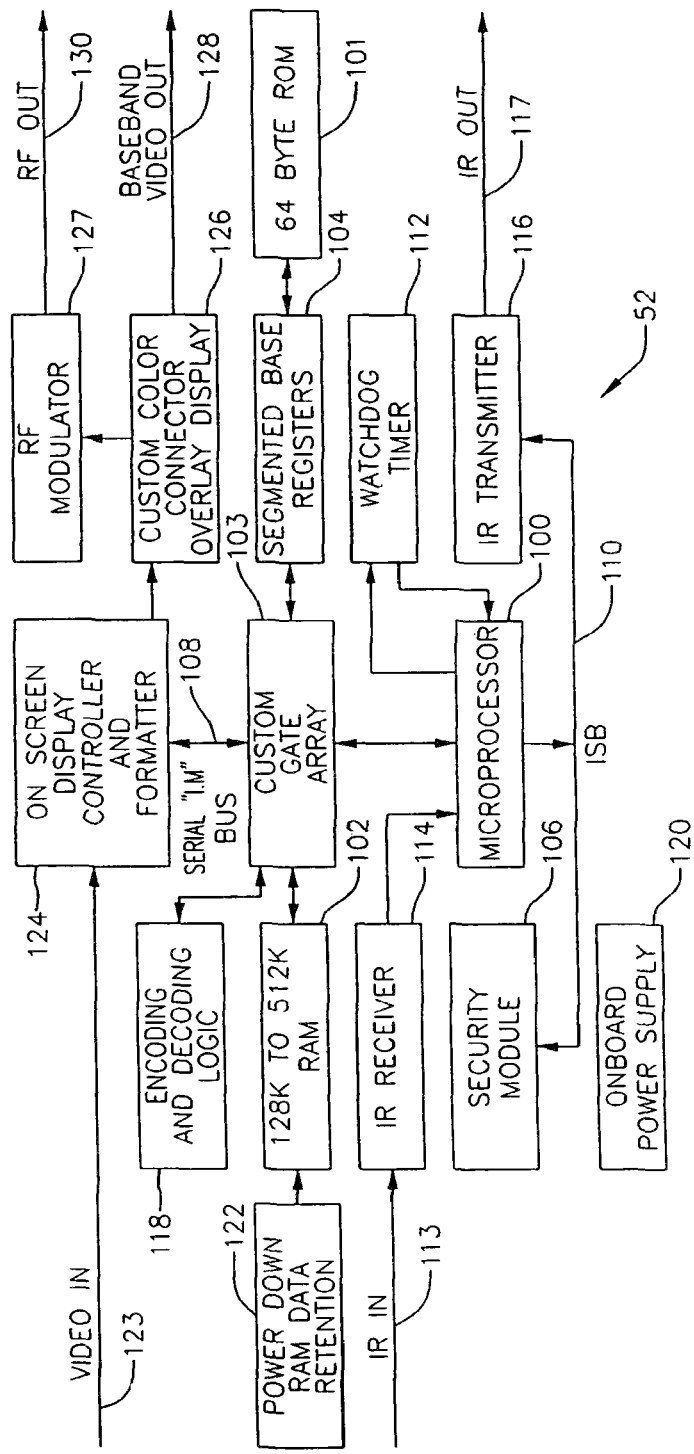
FIG. 1C is a block diagram of an embodiment of the electronic hardware unit utilized to perform the electronic on-screen schedule display and other functions.

In another embodiment, a board is included at a viewer's television set and the database is stored locally and commands are transmitted in the VBIs of programming on a designated channel, for example PBS. An example of a board for receiving program guide information, generating a program guide database, displaying the program guide, and interactively controlling the program guide is depicted in FIG. 1C. The commands are transmitted to the board in the vertical blanking intervals of programming broadcast on a designated channel. Alternatively, the commands could be transmitted to the local unit over land telephone lines. Additionally, as described below, in some systems the database is built remotely and the guide itself is transmitted to the local unit.

Figure 1D:
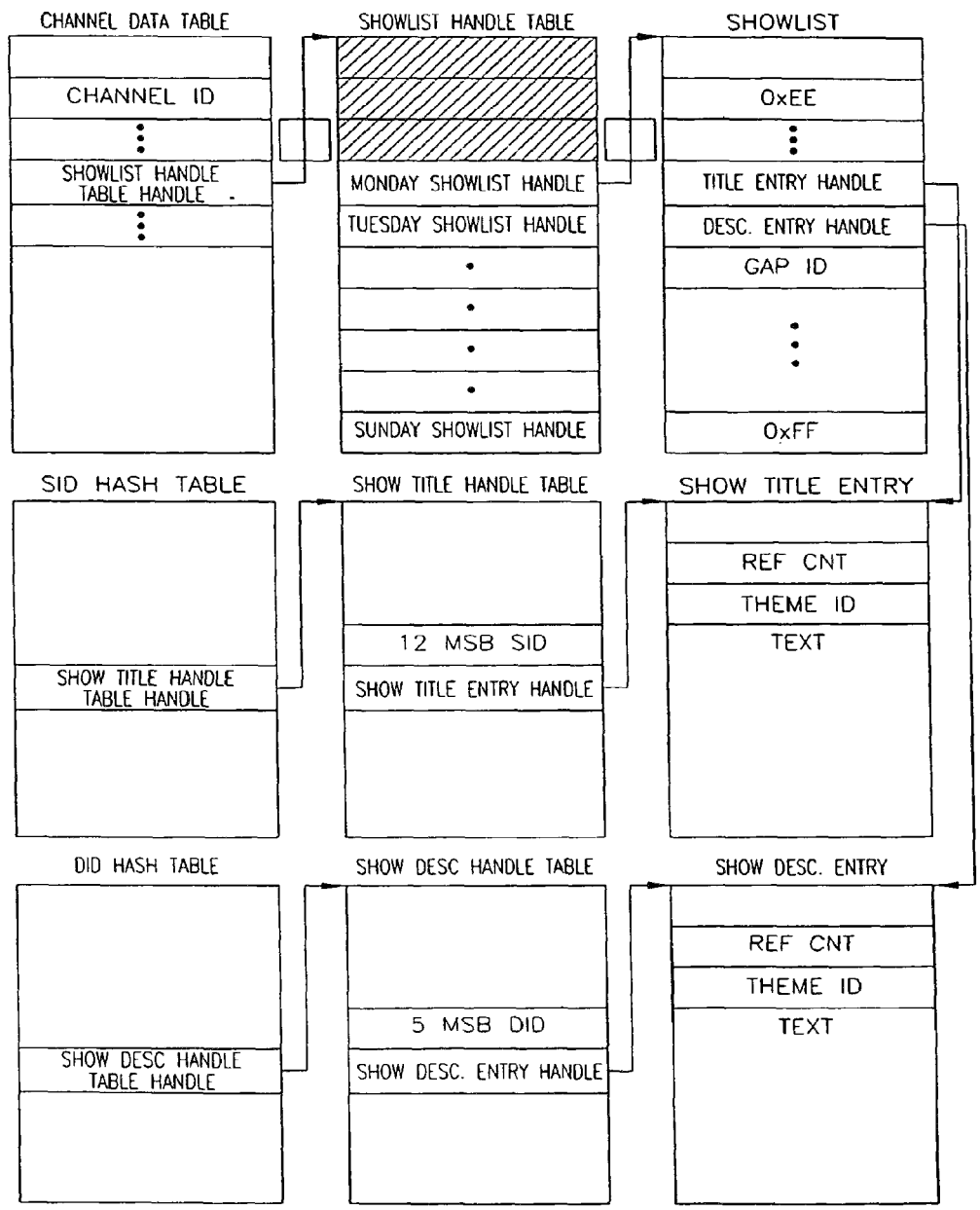
FIG. 1D is a chart that illustrates the hierarchical structure of an embodiment of a database built by the database engine.

The DBE builds a hierarchical database in the RAM. The hierarchical structure of the database is depicted in FIG. 1D. As shown, the database is structured internally as schedule data structures and theme data structures linked by handles and handle tables. Each handle is an index to a handle table which contains pointers to blocks of memory where items of the database are stored.

In another embodiment, for example in a DSS system, program guide data is transmitted as a bit stream that is processed by the database engine. Additionally, a N.E.W.S. (new, entertainment, weather, and sports) database has been developed. Commands including story text and story IDs are transmitted. Links from the program guide to stories related to a program can be created and the related stories can be accessed from the guide.

An advertisement (ad) database is also created from commands including advertising text and logos including IDs for linking the ads to shows displayed in the EPG. The user may therefore access the advertising information directly from the guide.

An internet database is also created from commands including URLs to internet sites related to programs displayed on the EPG. If the viewer is viewing the EPG on a platform that is Web enabled, e.g., WebTV, a PC, or PCTV, then a linked site can be accessed directly from the EPG.

Additionally, a graphics program module builds various displays utilizing schedule, show title, and other information from the database. If the OSD controller operates in the character mode, the display is a grid of character codes that are transferred to the QSD controller, which generates the on-screen display.

An input-response user interface program module responds to user input to generate new displays responsive to the particular input. In one preferred embodiment, the user utilizes an input device, e.g., a remote control unit, mouse, or keyboard, to place a pointer over a part of the current display and "clicks". The input-response module responds to the position of the pointer and the particular display currently displayed to generate a responsive display or take a particular action. In another preferred embodiment the user interface responds to function buttons on a remote control unit. Specific examples will be described below.

B. Broad Description

FIG. 1C is a block diagram of an embodiment of the electronic hardware unit utilized to perform the electronic on-screen schedule display and other functions. The particular circuit disclosed is for TVRO (TV Receive Only) customers having home satellite dishes for television viewing. This unit is coupled in series with existing customer TVRO equipment.

In FIG. 1C, the unit receives Baseband Video in 123 from the customer TVRO system. The unit optionally outputs Baseband Video out 128 or channel 3/4 RF out 130. The unit includes an 8-bit microprocessor 100, 64 bytes of code ROM 101, 512 K of RAM 102 for program data storage, a custom gate array 103, segmented base registers 104 for fast memory data manipulation, security logic 106 for decoding incoming encrypted data, a serial bus 108 for display controller interface, serial bus 110 for inter-processor communication, watchdog timer 112 for error recovery, IR input 113, IR transmitter circuits 116 for TV, VCR control, IR output 117, CRC-32 encoding and decoding logic 118, on-board power supply 120, video input 123, On-Screen Display Controller and Formatter 124, custom color converter 126, RF modulator 127, Baseband Video output 128 and RF output 130.

The on-screen display controller and formatter (OSDCF) 124 functions as an I/O controller, an on-screen display controller (OSD), and also as a closed-caption data (CCD) VBI data slicer. The VBI is a dead space in a TV signal that allows a television signal to reposition the scanning electron beam from the bottom to the top of the screen. Digital data, for example close-captioned data, is modulated onto the carrier signal during the VBI.

The OSDCF 124 includes an analog to digital convertor (ADC) which digitizes the incoming baseband video and extracts digital information transmitted in the VBIs. As explained more fully below, messages for transmission to the database are transmitted in the VBIs. These messages are transferred to processor 100, which executes a database engine process to build or update the database.

The OSD part of the OSDCF 124 includes cache memory, character memory, timing functions, and an external RAM. The OSD reads high level graphic commands sent from the processor 100 and stores graphic information in the RAM. The OSD outputs red (R), green (G), blue (B), graphic data which is used to generate a local video signal. Depending on the state of the user input interface, described below, the OSD local video output or the incoming live video will be displayed.

Accordingly, screen display graphic data generated by the database engine is transferred to the RAM of the OSD, which generates a local video that causes the display screen to be displayed on the television screen.

C. Scheduling Data Structures

As mentioned, the DBE builds a hierarchical database in the RAM. In one embodiment, the hierarchical structure of the database is as depicted in FIG. 1D. As shown, the database is structured internally as schedule data structures and theme data structures linked by handles and handle tables. Each handle is an index to a handle table which contains pointers to blocks of memory where structures of the database are stored.

The hierarchy for the schedule data structures, in descending order is as follows:

Channel Data Table: contains subscriber unit's list of channels;
Show List: contains time slots for each show scheduled to be broadcast for a channel;
Show Title: contains the title text and show title attributes;
Show Description: contains show's ratings, attributes, and description text.

A channel data table, depicted in FIG. 1E, is the highest data structure in the hierarchy. This table includes an entry for each channel received by the subscriber unit. The entries in the channel data table are changed infrequently and are determined by the location of the subscriber unit and type of services received. Each channel data table entry includes information concerning the channel and a handle to a show list handle table for the channel.

The next data structure in the hierarchy is the show list depicted in FIG. 1F. The show list includes a start time typically being midnight GMT and 24 hours of scheduling. The channel's schedule is given by an ordered sequence of show slots, with a show slot for each show to be broadcast by a particular channel for a particular day. Each slot includes a duration, show title handles and show description handle. Finding an entry corresponding to a given start time requires scanning the entries, in order, from the beginning of the show list and adding duration values.

The database, when fully constructed, holds a week's worth of show lists for each channel. The days of the week are accessed by incrementing the show list handle by two bytes. The show lists are updated each day at midnight GMT with the show list for the day just completed being deleted and the show list for the same day next week being added to the database.

The next data structures in the schedule hierarchy are the show title entries, depicted in FIG. 1G, and the show description entries, depicted in FIG. 1H. For a given show slot, the show title entry and show description entry are accessed utilizing the handles included in the slot. The show title and show description entries are stored in a memory pool divided into blocks. Each show title is identified by a unique 20-bit show identification number (SID), and each show description is identified by a unique 20-bit number assigned at the head end. The show title handles are based on the SID and the show title handles are offsets into a show title handle table. The entry in the show title table accessed by a particular show title handle includes the address of the first block in the memory pool where the show title entry is stored. Similarly, the show description handle table entry accessed by a show description handle stores the address of the first block in the memory pool where the show description entry is stored.

Each show title entry includes theme index ID and the text of the show title. Typically, a single show title entry will be referenced by many show lists for different channels, days, and times. Thus, by utilizing handles in the show lists, all show lists reference a single show title entry in memory so that memory is efficiently used. Many show title entries have a long life because the show titles may be for series that are broadcast over long periods of time and may be referenced by many showlists since many shows are broadcast by multiple channels.

Each show description entry includes a theme index ID, critics rating, MPAA rating for the show, traits mask bits, year produced, and show description text. Show description entries tend to have a shorter life than show title entries because a description is only valid for a particular episode of a series.

D. Schedule Search

To obtain schedule information for a particular time and to display the schedule information in the programming grid requires the following steps. For each channel in the channel list, the show list for the day is accessed and scanned. Horizontal blocks for the channel are sized according to the duration of the show slots including and following the selected time. The show title entry referenced by each show slot is accessed and the show title is displayed in the horizontal block corresponding to the show slot.

E. Theme Data Structures

A powerful feature of the database is the ability to group shows by theme. The theme IDs stored in the show title and show description entries are utilized to match particular shows to particular themes. For example, a viewer may want to see a listing of all comedy movies.

Each primary category, movies in the example above, has a theme category entry included in a theme category table, depicted in FIG. 1I. A theme category entry includes a theme category ID, a handle for the subcategory handle table, and the theme category name. The theme category ID is used to identify theme sub-categories, comedy in the example above, for this primary category.

There is a theme sub-category table, depicted in FIG. 1J, for each primary category. The table contains entries for each theme sub-category contained in a primary theme category. Each table entry includes the theme IDs corresponding to the sub-category entry and the name of the sub-category.

F. Theme Search

When the viewer initiates a search for a particular type of show, for example a comedy movie, each channel is inspected and theme IDs of each show listed are compared to theme IDs stored in the comedy entry of the theme sub-category table corresponding to the movie primary category entry. Information about shows with matching theme IDs is stored in a theme search data structure in a user interface local buffer.

The theme search function requires two calls to the database. The first of these calls initializes the theme search data structure to the first show that matches the theme category for a specific channel entry, including the show's time offset from the search time. The second call will then find the next matching show after a particular offset time, updating the theme search data structure and returning the offset to the next show. The second call will find the next matching show after a particular offset time, updating the search data structure and returning the starting offset of this next matching show.

The basic algorithm for the theme user interface access is as follows:
1. For a given starting time, for each channel entry, find the first show that matches the theme criteria on or during this time and create a list. Keep track of the channels that had matches;
2. Sort the list of shows in time order;
3. Find the channel with the earliest show in the sorted list;
4. Place this earliest show into the user interface search list;
5. For the channel with the earliest show, request the next show that matches the theme criteria and updated
5. offset time; and
6. Repeat steps 2-4 until all shows have been located or other specified limit is reached (i.e. search may be for a limited number of matches). The shows for the selected category are then displayed in time order.

G. Ad Data Structures

An ad list data structure is similar to the show list. It includes a start time and 24 hours of ad scheduling. The ad list is regionalized and includes an ad slot for each ad to be broadcast for a given day. The ad slot includes a duration and an Ad ID utilized to access an ad entry.

Each ad entry includes an ad banner text field, an ad text field, and a pointer to an ad logo, if appropriate. The ad logo includes a graphics file to be displayed with the ad. The ad entries include the ad banner text, and the ad text.

H. Building the Database

The database is built by a database engine software module operating on the processor. Messages comprising discrete commands are received by the database engine. Examples of commands include a Region Command which specifies channels available for a particular subscriber unit to be included in the Channel Data Table; a Channel Data command including information utilized to form the entries in the Channel Data Table; and Showlist, Show Title, and Show Description commands including SIDs and DIDs referencing areas in memory. The database engine selects only Showlist Commands relevant to channels included in the Channel Table for further processing.

The database engine creates storage locations in memory for all SIDs and DIDs included in any Showlist. Information included in commands having matching SIDs or DIDs is written to the referenced memory area. In practice the SIDs and DIDs are processed by a hashing system for more efficient searching.

The messages may be transmitted to a subscriber unit in various ways. A system for receiving messages in the VBIs of broadcast programming has been described above. In a DBS system the messages may be transmitted in a dedicated bit stream. In a DBS system video baseband signals are digitized, compressed, and modulated onto analog carrier signals. Because of advances in the art of compression, a carrier once used to transmit a single program can now transmit four programs. Typically, in addition to video signals, other bitstreams encoding information such as audio, VBI (vertical blanking information data such as closed caption and teletext), program guide information, and conditional access information, are provided as separate bitstreams, multiplexed into a composite bit stream, and modulated onto a carrier signal.

Alternatively, the database itself may be transmitted in a digital data stream. Typically, a digital data stream includes headers for classifying different portions of the data in the stream. The data stream transmitted from a satellite includes video data in the format specified by the Motion Pictures Expert Group (MPEG) standard, MPEG audio data, and EPG data. The MPEG video and audio data is decoded and transformed into signals which may be utilized by a television, monitor, or other display devices. The EPG data is stored in a buffer and utilized by a controller to generate an EPG display and to tune to correct programs specified by user input data.

Figure 1K:
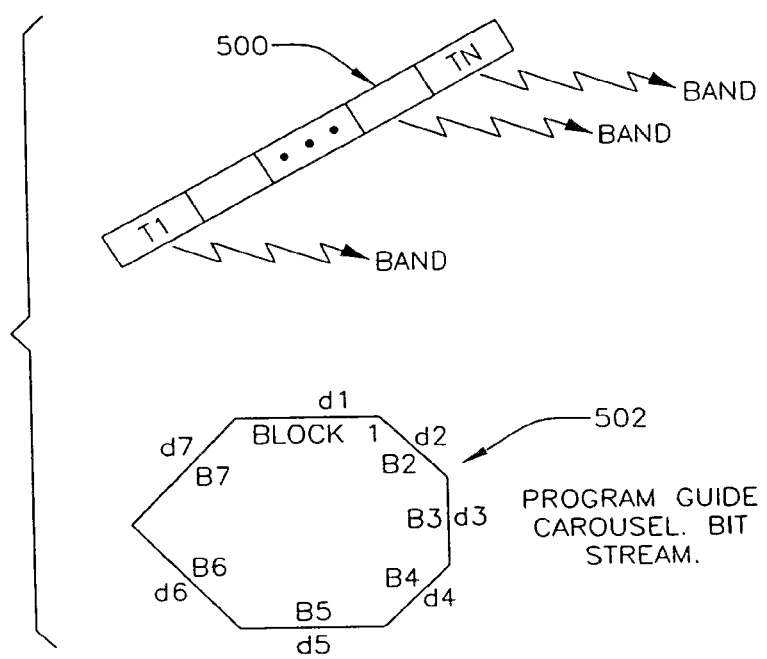
FIG. 1K illustrates a transmission scheme of a satellite that has several transponders simultaneously transmitting on different bands.

For example, in DSS, the program guide information is transmitted in blocks of 3 hours of programming for 36 channels. Programming is digitally modulated onto different bands. As depicted in FIG. 1K, a satellite has several transponders 500 simultaneously transmitting on different bands. Several channels can be modulated onto a single band utilizing digital compression techniques. A bit stream including the current programming is carried by all bands. However, future programming for different blocks of channels is transmitted on different bands. The blocks are transmitted in a carousel or endless loop so that there may be a delay before a particular time band is received.

A decoder at the viewer's location receives 16 carriers and controls a tuner/demodulator to select one carrier. The carrier is sampled, decoded, error-corrected, and demultiplexed to separate the various bit streams. The decoder includes one or more video decoder chips which decompress compressed video to reconstruct pictures of virtually any size.

When the viewer accesses the guide, the block for that time period is loaded into memory so that the user can interact with the guide. For a future time and different channel there may be a time delay. For example, if the current programming block were B1 and the block currently received is B4 the user must wait for blocks B5, B6, and B7 to be transmitted before the current programming can be received and displayed. The viewer would wait for a time delay equal to the sum of time durations for transmitting each block, i.e., d5+d6+d7. If the program guide block is modulated onto a different band, the cable box must tune to the band and wait until the desired block is transmitted on the carousel. Hence, if the guide is accessed for future programming, there could be a delay.

For cable, the database is built at the SST head end and sent over land-lines to the cable head end. Cable company can send data anyway they want, for example, via VBIs, satellite, digital data bit stream, and the like.

I. User Interface

The guide user interface (GUI) takes remote control commands as its primary input. In one embodiment, a user requests various functions by pressing function buttons on a remote control. In another embodiment, the GUI is utilized with different interactive regions on a display screen corresponding to different functions. The user moves the Cursor over the interactive region corresponding to a desired function and selects the function to generate a command. The particular form of entering a command is not critical and technology for utilizing voice commands may soon be available.

The user interface receives commands and responds with a requested display screen and by performing the function requested by the command. The function performed may be an action such as recording a program, tuning to a channel, accessing a related internet site, purchasing a pay-per-view program, or purchasing merchandise. The data and format of each screen is dependent on the previous screen, time of day, the contents of the database, the command received, and other parameters. A state table is used to define the screen flow.

For every defined screen, there is an entrance function, an exit function, an update function, and an array of request-handling functions. The entrance function is called when a state is first entered to collect all necessary data and format the screen. The exit function is called to release memory and data for the screen. The update function is called once per minute to update the screen time and to re-draw the screen if any information displayed on the screen needs to be updated.

Once in a particular state, the table contains a reference to another software function corresponding to each key on the remote control or to each interactive region on the screen. These referenced functions will be executed whenever an associated remote control button is pressed or interactive region is selected.

For example, if the user wishes to record a program, in the GUI embodiment, the viewer may move the cursor over to the record interactive region, which is then selected to request that the recording function be performed. A confirmation screen will then be generated. Once the user confirms the recording request, an entry is made in a recording queue. A record daemon is then called from the real-time executive to examine the queue and manage recording functions.

The screens are displayed by an on-screen display (OSD) controller based on graphic display commands issued by the database engine. Among the commands needed to draw system display screens are the Erase Screen Command, Draw Rectangle Command, Save Rectangle Command, Restore Rectangle Command, Move Rectangle Commands, Write ASCII String Command, and Draw Channel Icon Command.

Each screen includes areas that are constant (which are based on code and data stored in non-volatile memory), and variable areas such as show titles and descriptions which utilize data stored in the database. As described above in the description of the database engine, the database is structured to facilitate efficient searching for information, generally in the form of ASCII text strings, stored in the database. In addition, graphics files are also being stored in the database to be displayed in windows of the display screen.

H. Detecting Scrambling

According to one embodiment of the invention, the system utilizes a detector for determining whether one of the regularly scrambled television channels is now unscrambled. FIG. 2 is a block diagram of a receiving location including a system detector 302 for receiving scrambled and unscrambled channels. The system detector 302 determines if the channels are scrambled or unscrambled regardless of whether the incoming signal is analog or digital. A processor 304 coupled to the detector 302 updates the EPG database if the output of the detector indicates that a previously scrambled program is now unscrambled. In doing so, the processor 304 adds listings of television programs transmitted in the now unscrambled channel, into the EPG database. Alternatively, if program listing information of the unscrambled channel has already been downloaded to the EPG database as part of a periodic download, the information is not downloaded again. Instead, the processor 304 simply investigates whether the channel has been turned on for display. If not, the processor 304 turns the channel on, allowing program listings of the unscrambled channel to be displayed as part of a grid guide via display 306.

According to an alternative embodiment of the invention, the system determines that a regularly scrambled channel is now unscrambled from information sent by the service provider. Thus, a separate detector is no longer needed. In this scenario, the service provider transmits data to the system as to the time periods during which the unscrambling will take place. At the start of such time period, data in the EPG database is updated to reflect the fact that the channel is now unscrambled.

Figure 3:
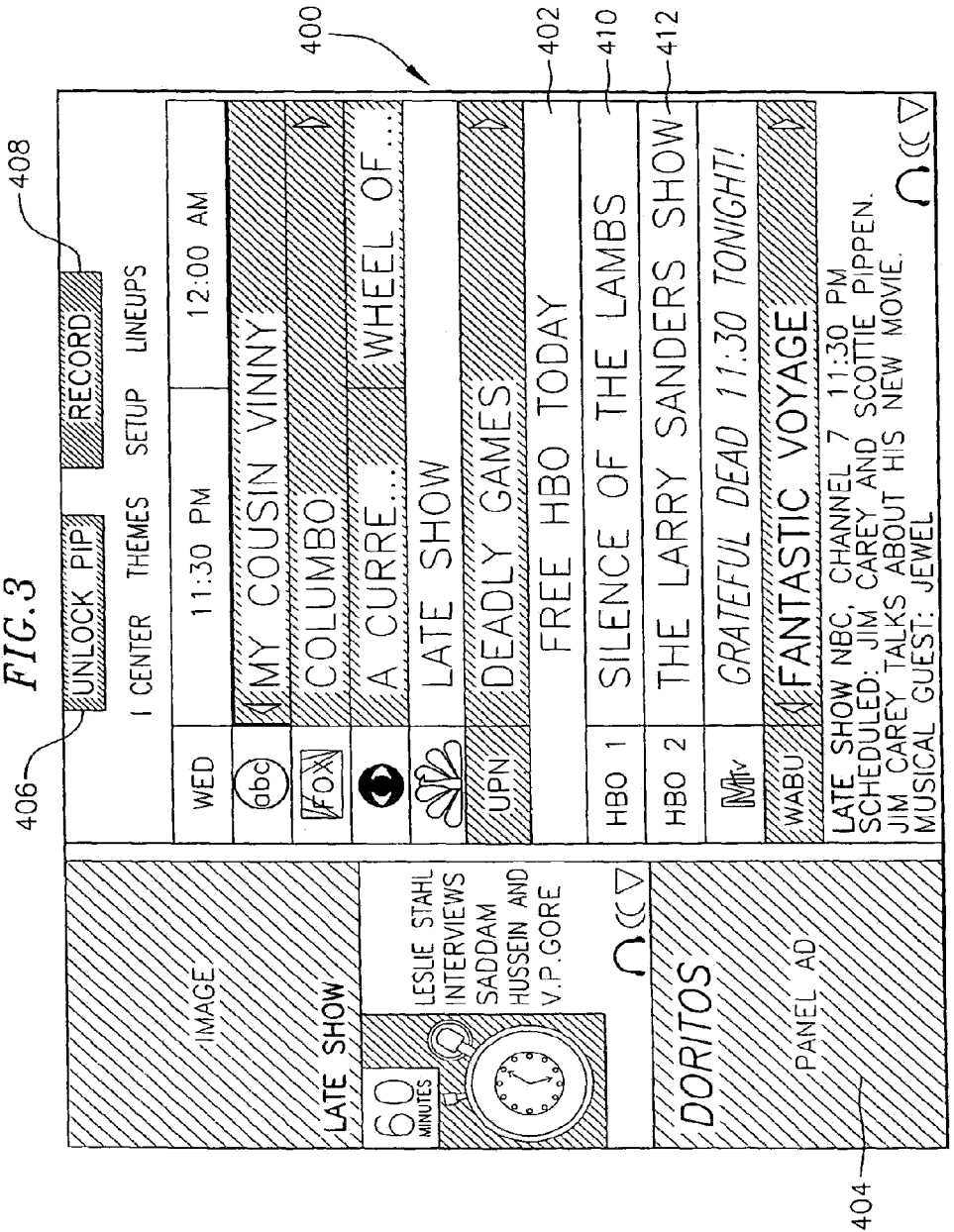
FIG. 3 is an exemplary grid guide including a promotional message tile in accordance with the present invention.
Figure 4:
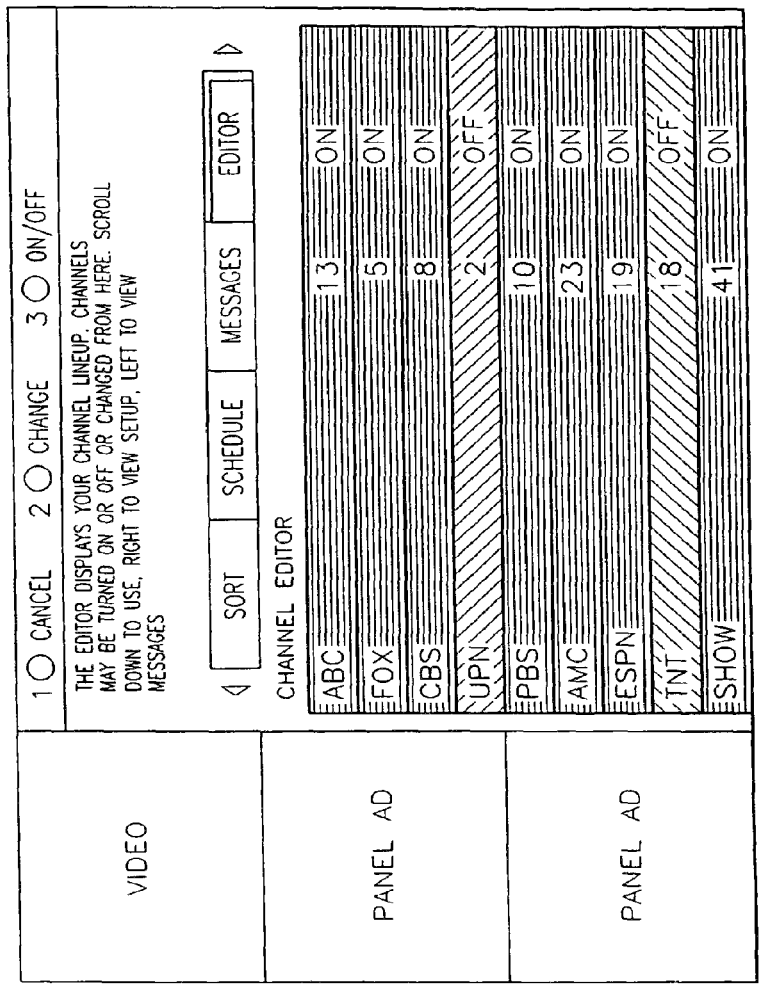
FIG. 4 is an exemplary screen editor for selecting channels for viewing.

To catch the user's attention of an unscrambled channel, the system introduces a promotional message to this effect, on a grid guide. FIG. 3 is an illustration of an exemplary guide according to one embodiment of the invention. A grid guide area 400 has a plurality of tiles in which channels and corresponding program titles are displayed. A user may select channels and associated program titles he or she wants displayed on the guide, by a channel editor screen as disclosed in provisional application Ser. No. 09/040,001, filed on Mar. 17, 1998. FIG. 4 is an illustration of a channel editor screen according to one embodiment of the invention. As illustrated in this figure, the editor screen displays a list of all available channels and provides users the option to toggle individual channels on and off. The channels toggled on will be displayed on the guide. The channels toggled off will not be displayed on the guide.

Referring back to FIG. 3, one of the tiles 402 in the guide promotes a premium channel by a banner "Free HBO Today". Alternatively, a panel advertisement area 404 could promote the premium channel with the same message. International Application No. 9,815,093 and the applications incorporated by reference therein, disclose the incorporation of panel advertisements and virtual channel advertisements into an EPG at a user's television receiver. If the message is displayed in the panel advertisement area 404, the following description regarding tile 402 is also applicable to area 404.

For the purpose of describing the operation of the invention, it is assumed that a remote controller sends IR commands to a processor that is programmed to carry out the described operations with the aid of a clock. The remote controller has up/down and left/right arrow keys and function keys that are color coded to match soft-key like function blocks 406 and 408. The pressing of the left/right arrow key causes horizontal movement of a cursor displayed on the guide. The pressing of the up/down arrow key causes the cursor to move vertically on the guide. The remote controller could also be configured with other key combinations that perform the described functions and other functions not related to the invention.

Figure 5:
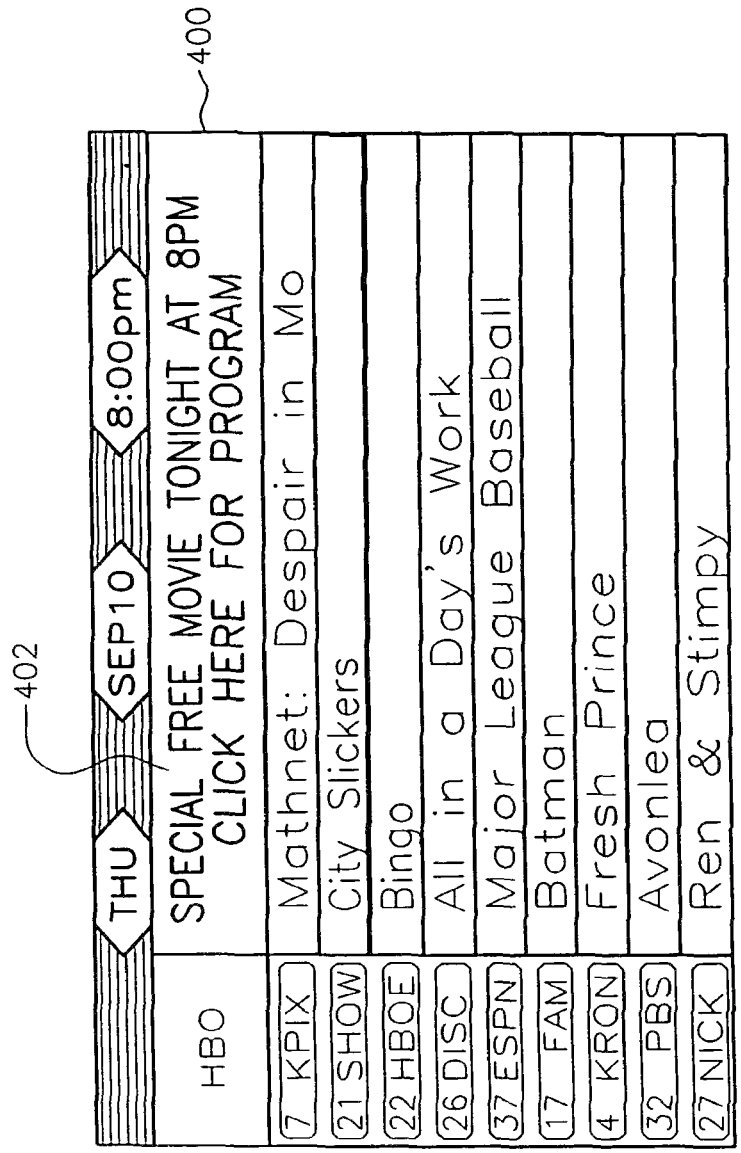
FIG. 5 is an exemplary grid guide including a promotional message tile displayed at a fixed position at the top of the guide.

At the start time of the promotion, the processor inserts a promotional tile 402 into the grid guide area 400 to display a message alerting the user of the availability of an unscrambled program. For instance, the message might state "Free HBO Today" if the HBO channel is now unscrambled, and thus, available to non-subscribers as well as subscribers. The position in which the promotional tile 402 is displayed might be fixed, or relative to another program tile. FIG. 5 illustrates a grid guide where the promotional tile 402 is placed apart from the regular programs, at a fixed position on top of the program guide. One skilled in the art should recognize, however, that the promotional tile 402 might be displayed at a fixed position at the bottom of the guide. A person skilled in the art should also recognize that the promotional tile 402 may be visually distinguished by changing the color of the tile. Other methods such as displaying the program name in a different font may also be used to attract the user's attention to the promotional message.

According to one embodiment, at about the same time the display of the promotional tile occurs, the processor toggles on the channel(s) that carries the unscrambled programming, if that channel(s) is not already turned on. For example, if there are two HBO channels, the programs carried by the two channels are displayed in tiles 410 and 412 directly below the promotional tile 402. However, if the two channels have been toggled on before the start of the promotion, the system reorders the channels in the channel lineup to cause the channels to appear below, or in close proximity, to the promotional tile 402 if this is not already the case. In addition, the system might distinguish the unscrambled channels 410, 412 apart from the other channels when displaying them on the program guide. For instance, the unscrambled channels 410, 412 might appear in a different color or a different font from the regular channels on the guide.

In an alternative embodiment illustrated in FIG. 5, the system does not display the program information unless the user highlights the promotional tile 402 by moving the cursor with the arrow keys, and selects a function key for displaying program listings.

Preferably, display of promotional tile 402 and any reordering of channels occurs only if the user is a non-subscriber. Thus, the processor detects if the television receiver is already configured to unscramble a particular channel, i.e., the television receiver is already a subscriber to the premium channel service. In this case, the processor aborts the execution of the insertion of the promotional tile 402 and the reordering of the now unscrambled channel(s) in the lineup.

In the event that the system displays the promotional tile 402 on the guide, a user may highlight the promotional tile 402 by moving the cursor with the arrow keys. The highlighting of the promotional tile 402 causes the system to display "ADD LISTINGS" and "SUBSCRIBE" (not shown), respectively, on function blocks 406 and 408. If the user presses the function key that matches the "ADD LISTINGS" block, the system turns-on the now unscrambled channels permanently on the grid guide. In other words, these channels are added to the list of displayed channels, and remain on until turned off again though the editor screen of FIG. 4.

If the user presses the function key that matches the "SUBSCRIBE" block, the system checks if there is a backlink to a central control station for the headend. If such a backlink is present, the system transmits to the control station an order to subscribe to the highlighted premium channel service. Upon subscription to the premium channel service, the user's receiver is enabled to unscramble the television signal transmitted by the service provider.

In the event that program tiles 410, 422 listing program information of an unscrambled channel is displayed on the guide, program listings of an unscrambled program falling under a theme group pre-selected by the user are indicated as belonging to such theme group. Similarly, if a scrambled channel has a favorite channel link (as shown in FIG. 1E) when it is unscrambled, the system updates the favorite list to include the channel in the favorite list.

A user may highlight a program tile 410, 412 by moving the cursor with the arrow keys on the remote controller. When one of the program tiles 410, 412 is highlighted, function blocks 406 and 408 display "WATCH" and "RECORD" (not shown), respectively. If the user presses the function key that matches the "WATCH" block, the system causes the television set to be turned and/or tuned to the channel transmitting the unscrambled program, on at or close to the time the highlighted program begins.

Alternatively, if the viewer seeks to tune to a program listed for the unscrambled channel which is not currently on, the system causes a screen to pop-up asking the viewer whether the viewer wishes to schedule an autotune to the program when the program comes on. If the viewer indicates in the affirmative, the system tunes to the program when the program comes on. Preferably, the system asks for viewer confirmation before tuning the viewer to the program if the viewer is in the midst of watching a different program.

In addition, the user may also record the program by pressing a function key that matches the "RECORD" block. If the program is not currently on, the system asks the viewer whether the viewer wishes to schedule a recording of the program when the program does come on. If the user indicates in the affirmative, the system activates a VCR to record the program when the program comes on.

FIG. 6 illustrates the invention in a slightly different screen format. The same reference numbers are used to identify the areas of the screen used by the invention.

Figure 7:
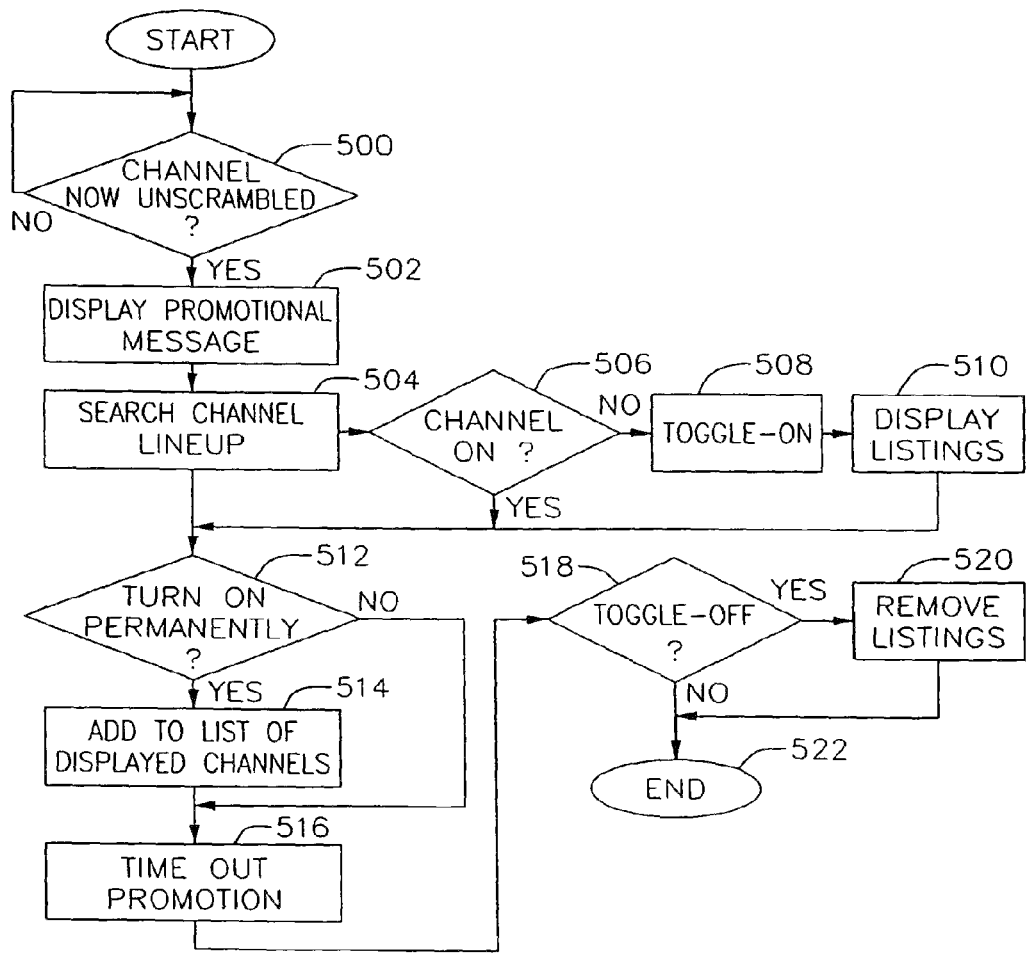
FIG. 7 is a process flow diagram for displaying a promotional tile and related program information tiles.

FIG. 7 is an exemplary process flow diagram for displaying a promotional tile 402 and related program information tiles 410, 412. The process starts and inquires in step 500 whether a previously scrambled channel is now unscrambled. As discussed above in, the system detector 302 (FIG. 2) in the receiving location determines if the channels are scrambled or unscrambled, and transmits this information to the processor 304. Alternatively, the system determines that a regularly scrambled channel is now unscrambled from information sent by the service provider. The processor in this scenario is programmed to receive a promotion command, including the time period during which the promotion will take place, from the cable headend or broadcast transmitter of a television distribution system. The promotion command could be sent to the receiving location as part of a periodic download of EPG data, in which case the processor stores the promotion command and initiates a scheduling operation to execute the promotion command at a time specified by the cable headend or broadcase transmitter. Alternatively, the promotion command could be sent to the television receiver to be executed immediately upon receipt. In either case, as represented by step 502, the process inserts tile 402 with the promotional message into grid area 400 of the EPG.

In step 504, the process searches the channel lineup available to the user to locate the channel which is now unscrambled. The channel lineup indicates the status of a channel as being on or off. The process thus inquires in step 506 if the channel is on. If the channel is off, as reflected by the NO branch to the inquiry of step 506, the channel is toggled on in step 508 and displayed in step 510 along with its program listings.

If the channel has already been turned on, the channel along with its program listings, will already be displayed on the guide. Thus, in all cases, the programs carried by the unscrambled channel are displayed in tiles 410 and/or 412 below, or at least in proximity to, tile 402.

During the premium channel promotion, the process continually monitors the status of the "ADD LISTINGS" function. If the user presses the function key that matches the "ADD LISTINGS" block, as inquired in step 512, the processor keeps the unscrambled channel turned on even after the promotional period, i.e., the channel is added to the list of displayed channels in step 514. This might be implemented by storing the unscrambled channel in memory until the promotional period is over, and then resetting the on/off status of the stored channel to on. The channel remains on until turned off again though the editor screen of FIG. 4.

As represented by a block 516, processor also executes a timeout operation responsive to the promotion command. The timeout equals the period of the promotion, e.g., one day or two days. After the timeout period, the process deletes promotional tile 402 from grid area 400. The process then inquires in step 518 if the channel is to be toggled-off and deleted from the guide. This will occur in step 520 if the user has not selected the "ADD LISTINGS" function for keeping the channel listing displayed permanently on the guide. The process then ends in step 522.

While a full and complete disclosure of the invention has been provided hereinabove, it will be obvious to those skilled in the art that various modifications and changes may be made. Accordingly, the disclosures and descriptions herein are illustrative, but not limiting, of the scope of the invention which is set forth in the following claims.

The invention claimed is:
1. A method comprising:
receiving a plurality of program listings for a plurality of programs, including a program listing for a first program of the plurality of programs, wherein the first program is a restricted-access program;
determining that access to the first program is no longer restricted during a promotional time period;
determining whether a user has access to the first program; and
generating for display a promotion that provides access to the first program in response to determining that the user does not have access to the first program, wherein when the promotional time period ends, the promotion is no longer generated for display.

2. The method of claim 1, further comprising generating for display program listings including a second program listing associated with a second program.

3. The method of claim 1, further comprising visually distinguishing the promotion generated for display from other program listings.

4. The method of claim 1, wherein generating for display the promotion includes modifying the program listings generated for display to include the program listing for the first program.

5. The method of claim 1, further comprising positioning the program listing for the first program in closer proximity to the promotion than to other listings.

6. The method of claim 1, further comprising ordering program listings generated for display to position the first program listing above other program listings.

7. The method of claim 1, further comprising ordering program listings generated for display to position the first program listing below other program listings.

8. The method of claim 1, further comprising:
receiving a first user input requesting access to the first program; and
providing access to the first program in response to receiving the first user input.

9. The method of claim 1, further comprising:
receiving a first user input requesting access to the first program,
wherein receiving the first user input comprises receiving a selection of the promotion during the promotional time period.

10. A system comprising:
control circuitry configured to:
receive a plurality of program listings for a plurality of programs, including a program listing for a first program of the plurality of programs, wherein the first program is a restricted-access program;
determine that access to the first program is no longer restricted during a promotional time period;
determine whether a user has access to the first program; and
generate for display a promotion that provides access to the first program in response to determining that the user does not have access to the first program, wherein when the promotional time period ends, the promotion is no longer generated for display.

11. The system of claim 10, wherein the control circuitry is further configured to generate for display program listings including a second program listing associated with a second program.

12. The system of claim 10, wherein the control circuitry is further configured to visually distinguish the promotion generated for display from other program listings.

13. The system of claim 10, wherein the control circuitry configured to generate for display the promotion is further configured to modify program listings generated for display to include the program listing for the first program.

14. The system of claim 10, wherein the control circuitry is further configured to position the program listing for the first program in closer proximity to the promotion than to other listings.

15. The system of claim 10, wherein the control circuitry is further configured to order program listings generated for display to position the first program listing above other program listings.

16. The system of claim 10, wherein the control circuitry is further configured to order program listings generated for display to position the first program listing below other program listings.

17. The system of claim 10, wherein the control circuitry is further configured to:
receive a first user input requesting access to the first program; and
provide access to the first program in response to receiving the first user input.

18. The system of claim 10, wherein the control circuitry is further configured to:
receive a first user input requesting access to the first program,
wherein receiving the first user input comprises receiving a selection of the promotion during the promotional time period.

* * * * *